(12) United States Patent
Koenig et al.

(10) Patent No.: US 9,944,008 B2
(45) Date of Patent: Apr. 17, 2018

(54) METHOD FOR EXTRUDING PLASTIC MATERIALS

(75) Inventors: Thomas Koenig, Leverkusen (DE); Michael Bierdel, Leverkusen (DE); Ulrich Liesenfelder, Bergisch-Gladbach (DE); Klemens Kohlgrüber, Kuerten (DE); Johann Rechner, Kempen (DE)

(73) Assignee: COVESTRO DEUTSCHLAND AG, Leverkusen (DE)

( * ) Notice: Subject to any disclaimer, the term of this patent is extended or adjusted under 35 U.S.C. 154(b) by 1539 days.

(21) Appl. No.: 12/999,810

(22) PCT Filed: May 30, 2009

(86) PCT No.: PCT/EP2009/003891
§ 371 (c)(1),
(2), (4) Date: Jun. 20, 2011

(87) PCT Pub. No.: WO2009/152948
PCT Pub. Date: Dec. 23, 2009

(65) Prior Publication Data
US 2011/0233818 A1 Sep. 29, 2011

(30) Foreign Application Priority Data

Jun. 20, 2008 (DE) .................. 10 2008 029 305

(51) Int. Cl.
*B29C 47/40* (2006.01)
*B29C 47/08* (2006.01)
(Continued)

(52) U.S. Cl.
CPC .......... *B29C 47/40* (2013.01); *B29C 47/0861* (2013.01); *B29C 47/402* (2013.01);
(Continued)

(58) Field of Classification Search
CPC ............ B29C 47/6043; B29C 47/6062; B29C 47/6056
(Continued)

(56) References Cited

U.S. PATENT DOCUMENTS 3,912,687 A * 10/1975 Haupt et al. .................. 528/199
4,205,140 A * 5/1980 Liebig et al. .................. 525/67
(Continued)

FOREIGN PATENT DOCUMENTS

DE 862668 C 1/1953
EP 0160124 A2 11/1985
(Continued)

OTHER PUBLICATIONS

Todd, David B., "Improving Incorporation of Fillers in Plastics", Advances in Polymer Technology, vol. 19, No. 1, (2000), pp. 54-64.
(Continued)

*Primary Examiner* — Walter D. Griffin
*Assistant Examiner* — Marc C Howell
(74) *Attorney, Agent, or Firm* — K&L Gates LLP

(57) ABSTRACT

The invention relates to a process for extruding plastic compositions, in particular polymer melts and mixtures of polymer melts, above all thermoplastics and elastomers, particularly preferably polycarbonate and polycarbonate blends, also with the incorporation of other substances such as for example solids, liquids, gases or other polymers or other polymer blends with improved optical characteristics, with the assistance of a multi-screw extruder with specific screw geometries.

16 Claims, 7 Drawing Sheets

(51) Int. Cl.
| | |
|---|---|
| B29C 47/62 | (2006.01) |
| B29C 47/00 | (2006.01) |
| B29K 7/00 | (2006.01) |
| B29K 9/06 | (2006.01) |
| B29K 23/00 | (2006.01) |
| B29K 25/00 | (2006.01) |
| B29K 27/06 | (2006.01) |
| B29K 27/00 | (2006.01) |
| B29K 33/00 | (2006.01) |
| B29K 55/02 | (2006.01) |
| B29K 59/00 | (2006.01) |
| B29K 67/00 | (2006.01) |
| B29K 69/00 | (2006.01) |
| B29K 71/00 | (2006.01) |
| B29K 75/00 | (2006.01) |
| B29K 77/00 | (2006.01) |
| B29K 79/00 | (2006.01) |
| B29K 81/00 | (2006.01) |
| B29K 105/00 | (2006.01) |
| B29K 105/06 | (2006.01) |
| B29K 105/16 | (2006.01) |

(52) U.S. Cl.
CPC ......... *B29C 47/62* (2013.01); *B29C 47/0004* (2013.01); *B29C 47/0021* (2013.01); *B29K 2007/00* (2013.01); *B29K 2009/06* (2013.01); *B29K 2011/00* (2013.01); *B29K 2023/06* (2013.01); *B29K 2023/12* (2013.01); *B29K 2025/00* (2013.01); *B29K 2027/06* (2013.01); *B29K 2027/16* (2013.01); *B29K 2033/12* (2013.01); *B29K 2055/02* (2013.01); *B29K 2059/00* (2013.01); *B29K 2067/00* (2013.01); *B29K 2067/006* (2013.01); *B29K 2069/00* (2013.01); *B29K 2071/00* (2013.01); *B29K 2071/12* (2013.01); *B29K 2075/00* (2013.01); *B29K 2077/00* (2013.01); *B29K 2079/08* (2013.01); *B29K 2081/04* (2013.01); *B29K 2081/06* (2013.01); *B29K 2105/005* (2013.01); *B29K 2105/0008* (2013.01); *B29K 2105/0026* (2013.01); *B29K 2105/0032* (2013.01); *B29K 2105/0044* (2013.01); *B29K 2105/06* (2013.01); *B29K 2105/16* (2013.01)

(58) Field of Classification Search
USPC ............. 366/82, 85, 301; 425/204, 208, 209
See application file for complete search history.

(56) References Cited

U.S. PATENT DOCUMENTS

| | | | |
|---|---|---|---|
| 4,824,256 | A | 4/1989 | Haring et al. |
| 5,487,602 | A | 1/1996 | Valsamis et al. |
| 5,947,887 | A * | 9/1999 | White et al. .................... 588/11 |
| 6,179,460 | B1 * | 1/2001 | Burkhardt et al. ............. 366/82 |
| 6,447,156 | B2 * | 9/2002 | Maris .............................. 366/82 |
| 6,974,620 | B1 * | 12/2005 | Tsunekawa et al. .......... 428/141 |
| 7,129,315 | B2 | 10/2006 | Kirchhoff et al. |
| 2002/0161137 | A1 * | 10/2002 | Wilkinson .................... 525/453 |
| 2004/0106703 | A1 * | 6/2004 | Etzrodt et al. ................ 523/330 |
| 2007/0209744 | A1 * | 9/2007 | Matsumura ................... 152/510 |
| 2007/0213418 | A1 * | 9/2007 | Vermilion et al. .............. 521/83 |
| 2008/0004426 | A1 * | 1/2008 | Brack et al. .................. 528/503 |
| 2008/0033092 | A1 * | 2/2008 | Santos et al. ................. 524/445 |

FOREIGN PATENT DOCUMENTS

| | | |
|---|---|---|
| EP | 1740638 A1 | 1/2007 |
| WO | WO-02/09919 A2 | 2/2002 |
| WO | WO-2005/103114 A1 | 11/2005 |

OTHER PUBLICATIONS

Rauwendaal, Chris, "The Geometry of Self-Cleaning Twin-Screw Extruders", Advances in Polymer Technology, vol. 15, No. 2, (1996), pp. 127-133.

* cited by examiner

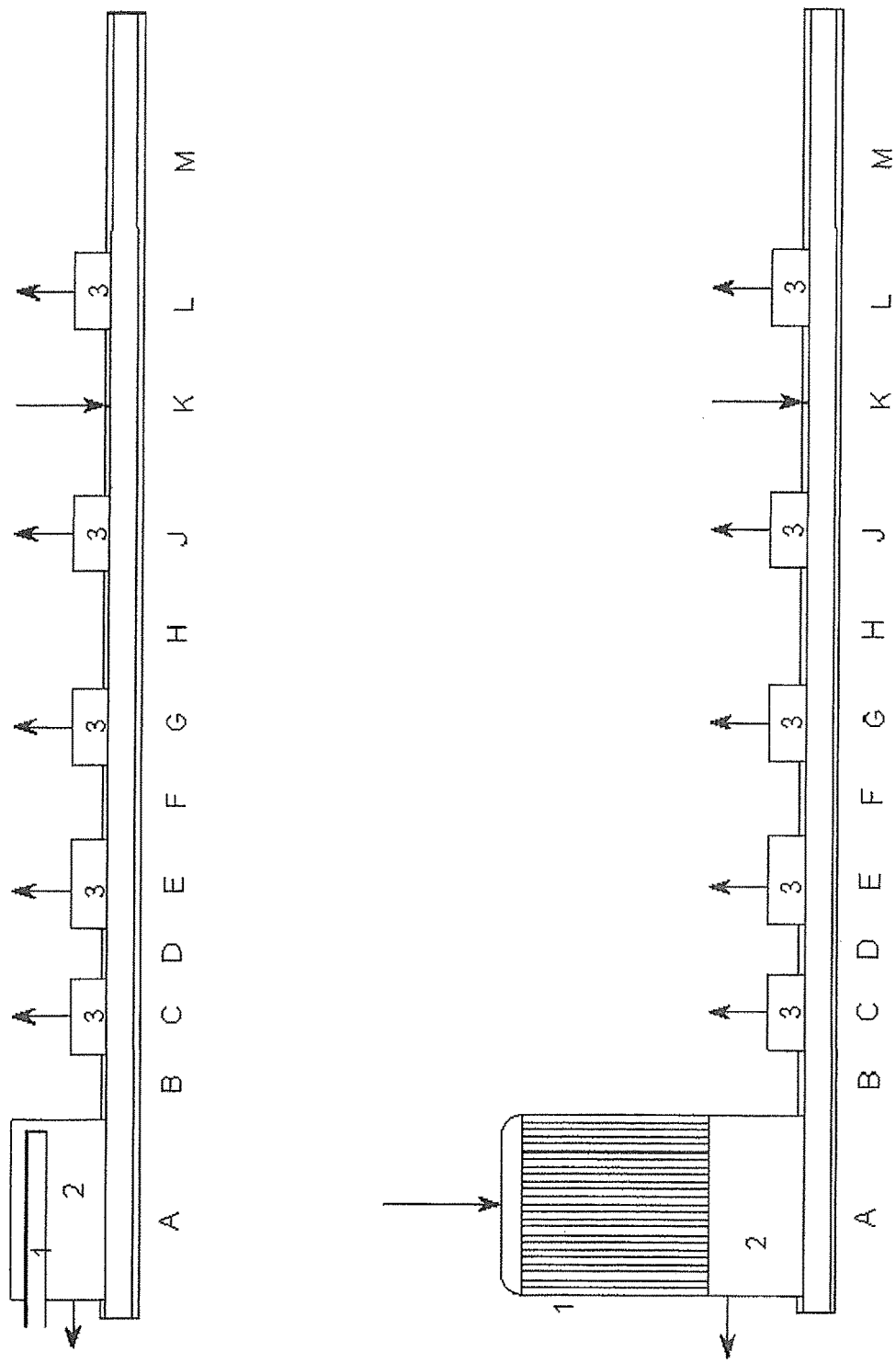

METHOD FOR EXTRUDING PLASTIC MATERIALS

PRIORITY

Priority is claimed as a national stage application, under 35 U.S.C. § 371, to PCT/EP2009/003891, filed May 30, 2009, which claims priority to German application 102008029305.9, filed Jun. 20, 2008. The disclosures of the aforementioned priority applications are incorporated herein by reference in their entirety.

CROSS-REFERENCE TO THE RELATED APPLICATIONS (Not Applicable)

STATEMENT REGARDING FEDERALLY SPONSORED RESEARCH OR DEVELOPMENT (Not Applicable)

THE NAMES OF THE PARTIES TO A JOINT RESEARCH AGREEMENT (Not Applicable)

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB) (Not Applicable)

STATEMENT REGARDING PRIOR DISCLOSURES BY THE INVENTOR OR A JOINT INVENTOR (Not Applicable)

BACKGROUND OF THE INVENTION (1) Field of the Invention

The invention relates to a process for extruding plastic compositions, in particular polymer melts and mixtures of polymer melts, above all thermoplastics and elastomers, particularly preferably polycarbonate and polycarbonate blends, also with the incorporation of other substances such as for example solids, liquids, gases or other polymers or other polymer blends with improved optical characteristics, with the assistance of a multi-screw extruder with specific screw geometries.

2) Description of Related Art Including Information Disclosed Under 37 CFR 1.97 and 1.98

Extrusion is a known process in the production, compounding and processing of polymers. Extrusion is here and hereinafter taken to mean the treatment of a substance or substance mixture in a co-rotating twin- or multi-screw extruder, as is comprehensively described in [1] ([1]=Kohlgrüber. Der gleichläufige Doppelschneckenextruder [The co-rotating twin-screw extruder], Hanser Verlag Munich 2007).

The treatment of plastic compositions during extrusion includes one or more of the operations: conveying, melting, dispersion, mixing, expulsion of liquid constituents, degassing and pressure build-up.

In polymer production, extrusion serves, for example, to remove volatile constituents such as monomers and residual solvents from the polymer ([1], pages 192 to 212), to carry out polyaddition and polycondensation reactions and optionally to melt and convert polymers and optionally to mix additives with the polymer.

During polymer compounding, extrusion is above all used to produce mixtures of polymers with additives and auxiliaries and reinforcing materials and colors and to produce mixtures of different polymers which differ, for example, in chemical composition, molecular weight or molecular structure (see for example [1], pages 59 to 93). Compounding involves the conversion of a polymer into a finished plastics molding composition (or compound) using plastics raw materials, which are conventionally melted, and adding and incorporating and mixing fillers and/or reinforcing materials, plasticizers, bonding agents, slip agents, stabilizers, colors etc. with the polymer. Compounding often also includes the removal of volatile constituents such as for example air and water. Compounding may also a chemical reaction such as for example grafting, modification of functional groups or molecular weight modifications by deliberately increasing or decreasing molecular weight.

As is generally known and described, for example, in [1] on pages 169 to 190, mixing may be differentiated into distributive and dispersive mixing. Distributive mixing is taken to mean the uniform distribution of various components in a given volume. Distributive mixing occurs, for example, when similar polymers are mixed. In dispersive mixing, solid particles, fluid droplets or gas bubbles are firstly subdivided. Subdivision entails applying sufficiently large shear forces in order, for example, to overcome the surface tension at the interface between the polymer melt and an additive. Mixing is always understood below to mean distributive and dispersive mixing.

Melt conveying and pressure build-up are described on pages 73 et seq. of publication [1]. The melt conveying zones serve to transport the product from one processing zone to the next and to draw in fillers. Melt conveying zones are generally partially filled, such as for example during the transport of the product from one processing zone to the next, during degassing and in holding zones.

During polymer processing, the polymers are preferably converted into the form of a semi-finished product, a ready-to-use product or a component. Processing may produce, for example, by injection molding, extrusion, film blowing, calendering or spinning. Processing may also involve mixing polymers with fillers and auxiliary substances and additives as well as chemical modifications such as for example vulcanization.

As a person skilled in the art is aware, polymer extrusion is advantageously performed on extruders with two or optionally more screws.

Co-rotating twin- or optionally multi-screw extruders, the rotors of which are fully self-wiping, have long been known (DE 862 668). Extruders which are based on the principle of fully self-wiping profiles have been put to many different uses in polymer production, compounding and processing. Such extruders are known to have a good mixing action, a good degassing action and a good action for melting polymers. They offer advantages in the quality of the products produced therewith because polymer melts adhere to surfaces and degrade over time at conventional processing temperatures, which is prevented by the self-cleaning action of fully self-wiping screws. Rules for producing fully self-wiping screw profiles were stated, for example, in Klemens Kohlgrüber: Der gleichläufige Doppelschneckenextruder [The co-rotating twin-screw extruder], Hanser Verlag Munich 2007, p. 96 et seq. [1]. The design of single-, double- and triple-flighted profiles is described therein.

It is known to a person skilled in the art that in the region of the screw tips a particularly large amount of energy is dissipated in the melt, which leads locally to severe overheating in the product. This is explained, for example, in [1] on pages 160 et seq. This local overheating may result in harm to the product such as for example a change in odor, color, chemical composition or molecular weight or in the formation of non-uniformities in the product such as gel particles or specks. A large tip angle, in particular, is harmful in this respect.

Modern twin-screw extruders have a building-block system, in which various screw elements may be mounted on a core shaft. In this way, a person skilled in the art may adapt the twin-screw extruder to the particular task in hand. As a rule, screw elements with double- and triple-flighted profiles are used today, since single-flighted screw profiles have an excessively high energy input due to their large tip angle.

According to the prior art [1] (see, for example, page 101), the geometry of the fully self-wiping screw elements is defined via the following independent variables: the number of flights Z, centreline distance A and barrel diameter (corresponding to the diameter DE of the fully self-wiping profile). The number of flights here is the number of circular-arcs of each element which wipes the outer wall. The angle of any such circular arc, relative to the centre of rotation, is termed the tip angle KW0. In the region defined by the tip angle, the outer radius of the profile is equal to the barrel radius. According to the prior art, KW0 is not an independent variable that can be adjusted appropriately for the task in hand, but instead is a result of Eq. 1, being $$KW0 = \frac{\pi}{Z} - 2\arccos\left(\frac{A}{DE}\right) \quad \text{(Eq. 1)}$$

where KW0 is the tip angle of the fully self-wiping profile in radians and $\pi$ is the constant ($\pi \approx 3.14159$) that relates the circumference of a circle to its radius. The total of the tip angles across both elements of a closely intermeshing pair of elements SKW0 is necessarily $$SKW0 = 2\pi - 4Z\arccos\left(\frac{A}{DE}\right) \quad \text{(Eq. 2)}$$

The person skilled in the art is aware that directly self-wiping screw profiles cannot be inserted directly into a twin-screw extruder, but rather there have to be some clearances between the screw elements and the barrel and/or between the screw elements themselves. The person skilled in the art uses known methods, such as those described by way of example in [1], to obtain the geometric data for the actual screw geometries, on the basis of the contour of fully self-wiping screws. Pages 28 ff. in [1] describe various possible strategies for conveying elements. When the longitudinal section offsets or three-dimensional offsets stated in that reference are used, the tip angles KWA0 of the actual screws become smaller, as described by way of example in [1], p. 100, with respect to the angle KW0. In particular, large clearance between the screws leads to reduced KWA0. However, large clearance between the screws, reducing the tip angle, is disadvantageous, because it diminishes the amount of mutual self-cleaning effect provided by the screws, and long residence times occur at the surface of the screw elements, leading to local product degradation and therefore to impairment of product quality. The person skilled in the art is also aware that enlargement of the clearances impairs the effectiveness of screw elements in relation to conveying action and pressure increase, and successful completion of any given processing task therefore requires that excessive clearances be avoided.

BRIEF DESCRIPTION OF THE INVENTION

An object was therefore to find a process which extrudes polymers and which combines the quality advantages of self-cleaning to reduce gelling with the quality advantages of low temperature.

The object is surprisingly achieved in that a closely intermeshing, co-rotating degassing extruder is used, wherein screw elements which have particular geometries are used.

The present invention accordingly provides a process for compounding plastic compositions, in particular polymer melts and mixtures of polymer melts, above all thermoplastics and elastomers, particularly preferably polycarbonate and polycarbonate blends, also with incorporation of other substances such as for example solids, liquids, gases or other polymers or other polymer blends using co-rotating, closely intermeshing degassing extruders using screws co-rotating in pairs and being fully self-wiping in pairs with two or more screw flights, characterized in that the total of all of the tip angles (SKW) of a pair of elements is freely selectable, greater than zero and smaller than $$2\pi - 4Z\arccos\left(\frac{A}{DE}\right),$$

where Z is the number of flights, A is the centreline distance between two screw elements and DE is the outer diameter of the screw elements. The geometries of the thrust face and of the reverse face of screw elements according to the invention can be individually designed as required, and the edges delimiting the flights can be rounded off as required.

The invention is not here limited to screw elements of the currently conventional modular construction consisting of a screw with individual screw elements and core shafts, but also to screws of solid construction. The term "screw elements" should thus also be taken to mean screws of solid construction.

The number of flights Z of screw elements according to the invention is preferably 2, 3, 4, 5, 6, 7 or 8; it is particularly preferably from 2 to 4.

The outer radius of a screw profile is RE=DE/2, the inner diameter is DK and the inner radius is RK=DK/2. It is therefore always true that A=RE+RK.

The generating and generated profile of the screw elements according to the invention ("screw profile") is composed of circular arcs which merge tangentially into one another. The generating and generated profile of the screw elements according to the invention is always composed of at least 6*Z circular arcs.

The size of a circular arc is defined via its central angle and its radius. The abbreviated term angle of a circular arc is used hereinafter to mean the central angle of a circular arc. The position of a circular arc is defined via the position of its centre point and via the position of its two end points.

A feature of the profile of screw elements according to the invention is that one or more circular arcs can have a radius of magnitude zero. In this case, the profile has one or more kinks.

A predetermined screw profile of a first screw of a twin-screw extruder (the "generating" profile) unambiguously establishes the screw profile of a neighboring second screw (the "generated" profile). The screw profile of a first screw of the twin-screw extruder is therefore known as the generating screw profile, while the screw profile of the neighboring second screw of the twin-screw extruder is known as the generated screw profile. In the case of a multi-screw extruder, neighboring screws are always arranged alternately with a generating screw profile and a generated screw profile.

The screw profiles according to the invention are always closed and convex. The total of the angles of the individual circular arcs for each element is always $2\pi$.

A feature of screw elements according to the invention is that in each case a circular arc of the generated screw profile "corresponds" to a circular arc of the generating screw profile. "Correspond" means that the angles of corresponding circular arcs are of identical magnitude, the total of the radii of corresponding circular arcs is equal to the centreline distance, respectively one of the connecting lines between the centre point of a circular arc of the generating screw profile and end points thereof runs parallel to respectively one of the connecting lines between the centre point of the corresponding circular arc of the generated screw profile and end points thereof, the directions in which the end points of a circular arc of the generating screw profile lie, starting from the centre point of the circular arc, are in each case opposite to the directions in which the end points of the corresponding circular arc of the generated screw profile lie, starting from the centre point of the circular arc of the generated screw profile, the distance between the centre point of a circular arc of the generating screw profile and the centre point of a corresponding circular arc of the generated screw profile corresponds to the centreline distance, the connecting line between the centre point of a circular arc of the generating screw profile and the centre point of the corresponding circular arc of the generated screw profile is parallel to the connecting line between the point of rotation of the generating screw profile and the point of rotation of the generated screw profile, the direction in which the centre point of a circular arc of the generating screw profile would have to shift in order to be the same as the centre point of the corresponding circular arc of the generated screw profile is the same as that in which the point of rotation of the generating screw profile would have to shift in order to be the same as the point of rotation of the generated screw profile.

BRIEF DESCRIPTION OF THE DRAWINGS

FIG. 6 shows a degassing extruder according to the invention;

FIG. 7 shows a further degassing extruder according to the invention;

DETAILED DESCRIPTION OF THE INVENTION

Figure 1:
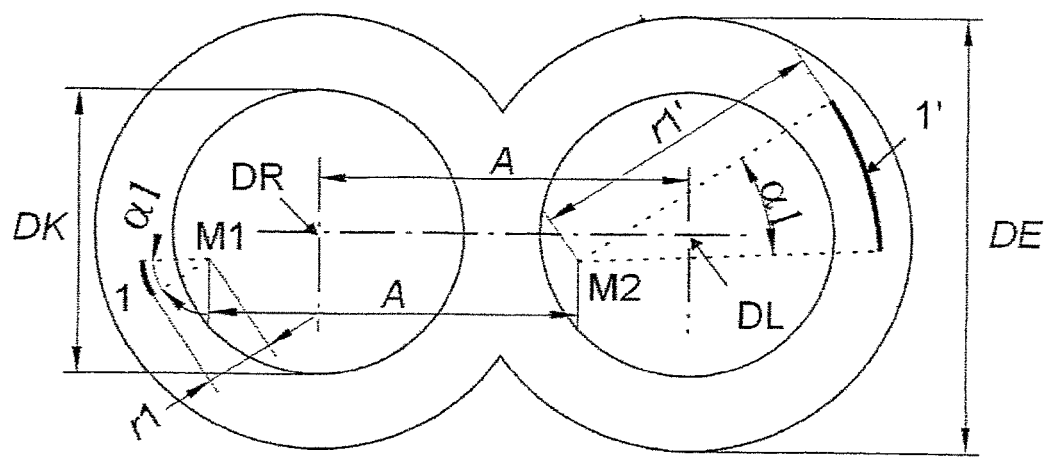
FIG. 1 shows an example of two corresponding circular arcs.

FIG. 1 shows an example of two corresponding circular arcs. The centre point of rotation of the generating screw is DR and the centre point of rotation of the generated screw is DL. In this figure, circular arc 1 is the generating arc and circular arc 1' is the generated arc.

A generating screw profile of screw elements according to the invention has Z circular arcs, the radii of which are equal to RE, where the centre points of these coincide with the centre point of rotation ("tip arcs").

A generating screw profile of screw elements according to the invention has Z circular arcs, the radii of which are equal to RK, and the centre points of which coincide with the centre point of rotation ("groove arc"). The corresponding generated screw profile likewise has Z tip arcs and Z groove arcs.

The total of the angles of the tip arcs and groove arcs of the generating screw profiles according to the invention is freely selectable, greater than zero and smaller than $$2\pi - 4Z\arccos\left(\frac{A}{DE}\right)$$

The total of the angles of all of the tip arcs of the generated and of the generating screw profile is equal to the total of the tip angles and groove angles of the generating screw profile and according to the invention is greater than zero and smaller than $$2\pi - 4Z\arccos\left(\frac{A}{DE}\right)$$

In one preferred design of screw elements as are used in the process according to the invention, the arrangement of tip arcs and of groove arcs is such that they occur in alternation around the periphery of the profile, i.e. around the periphery there is a groove arc following each tip arc and a tip arc following each groove arc. The result of this for the generated screw profile is necessarily that the arrangement of the tip arcs and groove arcs is such that they occur in alternation around the periphery of the profile, i.e. around the periphery there is a groove arc following each tip arc and a tip arc following each groove arc.

In one preferred design, the screw elements used according to the invention have the same profile on both screws, except for a rotation around the respective centre point of rotation of the profile by $\pi Z$ for even Z.

In another preferred embodiment, the screw elements used according to the invention are point-symmetrical with respect to the respective point of rotation of the profile, but are not mirror-symmetrical.

In another preferred embodiment, the screw elements used according to the invention are symmetrical with respect to lines passing through the middle of the tip arcs and of the groove arcs. A screw element with number of flights Z then has 2*Z symmetry lines.

The screw elements are preferably used as conveying elements. A conveying element is known to be distinguished in that (see for example [1], pages 227-248) the screw profile is rotated and extended continuously helically in the axial direction. The conveying element may have right- or left-handed flights. The pitch of the conveying element is preferably in the range from 0.1 times to 10 times the centreline distance, the pitch being taken to mean the axial length which is necessary for one complete rotation of the screw profile, and the axial length of a conveying element is preferably in the range from 0.1 times to 10 times the screw diameter.

For screw profiles of screw elements according to the invention, clearances in the range from 0.1 to 0.001, relative to the diameter of the screw profile, are used, preferably from 0.002 to 0.05 and particularly preferably from 0.004 to 0.02. The clearances may, as is known to a person skilled in the art, be of different dimensions or identical between screw and barrel and between screw and screw. The clearances may also be constant or, within the stated limits, variable. It is also possible to displace a screw profile within the clearances. Methods are known to a person skilled in the art for deriving a screw profile with clearances from a predetermined, fully self-wiping screw profile. Known methods for achieving this are for example the possibility, described in [1] on page 28 et seq., of centreline distance enlargement, longitudinal section offsets and three-dimensional offsets, all of which are known to a person skilled in the art. In the case of centreline distance enlargement, a screw profile of a relatively small diameter is constructed and spaced further apart by the amount of clearance between the screws. In the longitudinal section offset method, the longitudinal section profile curve (parallel to the axis of rotation of the respective element) is displaced by half the screw-screw clearance inwards perpendicularly to the profile curve, in the direction of the axis of rotation. In the three-dimensional offset method, starting from the three-dimensional curve on which the screw elements clean one another, the screw element is reduced in size in the direction perpendicular to the faces of the fully self-wiping profile by half the clearance between screw and screw. The longitudinal section and three-dimensional offset methods are preferred, the three-dimensional offset method being particularly preferred.

Figure 2:
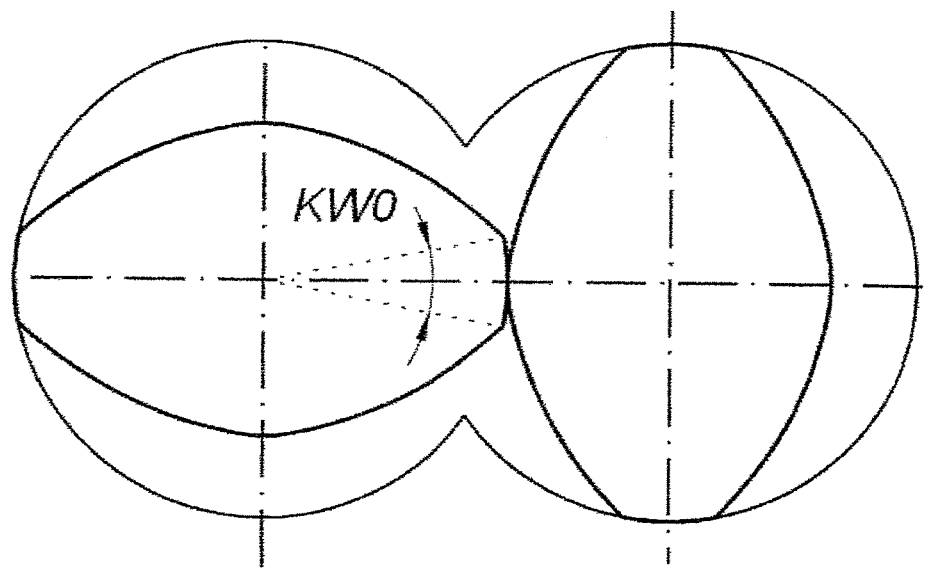
FIG. 2 shows a cross section of the profiles of double-flighted screw elements known from the prior art.

FIG. 2 shows a cross section of the profiles of double-flighted screw elements known from the prior art. The centreline distance is 48 mm, the outer diameter of a screw profile is 58 mm, the inner diameter corresponds to 38 mm and the tip angle KW0 in radians is 0.3788 (corresponding to 21.7°). The total of all of the tip angles SKW0, expressed in radians, is 1.5152.

Figure 3A:
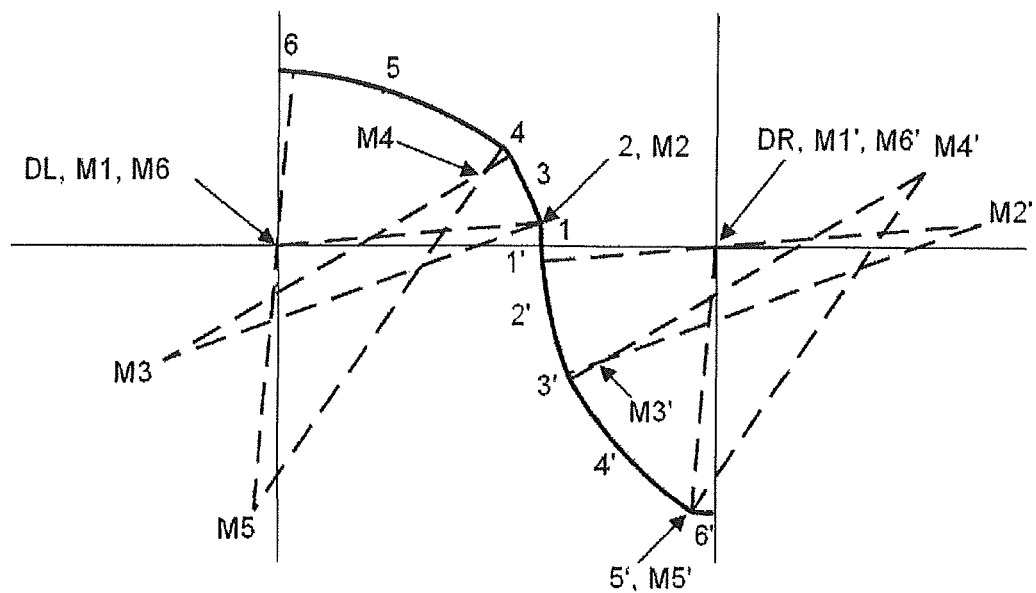
FIGS. 3a and 3b show a diagram of a cross section of a partial profile X of the generating screw profile and a partial profile Y of the generated screw profile of double-flighted screw elements used according to the invention.
Figure 3B:
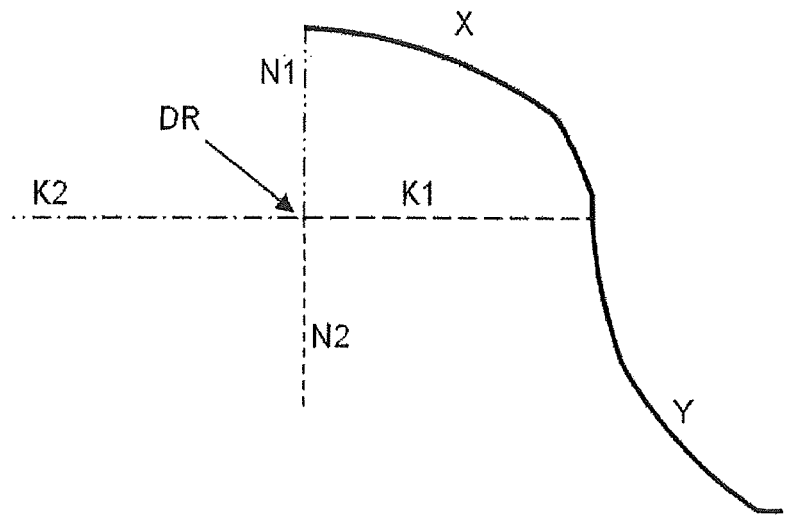

FIGS. 3a and 3b show by way of example a diagram of a cross section of a partial profile X of the generating screw profile, and, corresponding thereto, a partial profile Y of the generated screw profile of double-flighted screw elements used according to the invention. The partial profile X is formed by the circular arcs 1, 2, 3, 4, 5 and 6. The partial profile Y is formed by the circular arcs 1'. 2', 3', 4', 5' and 6' which correspond to the respective circular arcs of the partial profile X. The circular arcs are unambiguously defined by their respective centre points M1, M2, . . . , M6 and M1', M2' . . . , M6', and their respective angles and radii (see FIG. 3a).

In the present example, the centreline distance is 48 mm, the outer diameter of a screw profile is 58 mm and the inner diameter is 38 mm. The circular arc 1 is the tip arc of the generating partial profile, while circular arc 6 is the groove arc. The radius of circular arc 2 is 0, i.e. the generating profile has a kink in the tip arc.

In FIG. 3b, the labeling of the circular arcs and centre points has been removed to improve comprehensibility. The partial profiles X and Y are identical with the partial profiles shown in FIG. 3a.

Figure 4:
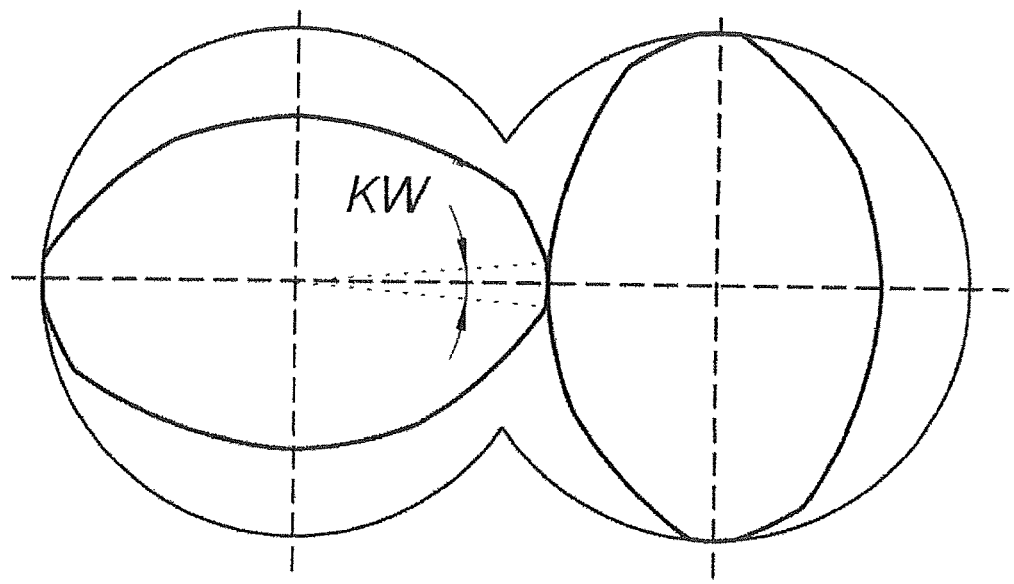
FIG. 4 shows a diagram of the cross section of screw elements used according to the invention.

FIG. 4 shows a diagram of the cross section of screw elements used according to the invention with a point-symmetrical screw profile as found in FIG. 3a or 3b, if the partial profiles shown in FIGS. 3a and 3b are continued point-symmetrically. All of the tip angles are identical and equal to 0.17454 (10°). By way of example, a tip angle KW has been included in the drawing. The total of all of the tip angles SKW is 0.698, less than half of the element of the prior art. This is a marked advantage over the prior art. Another advantage of this screw profile is that when the direction of rotation is clockwise the thrust face forms, with respect to the barrel, a markedly larger angle than the reverse side, and this again leads to markedly lower energy input in the case of partial fill. The direction of rotation can equally be reversed, and this leads to increased extension at the tip.

Figure 5:
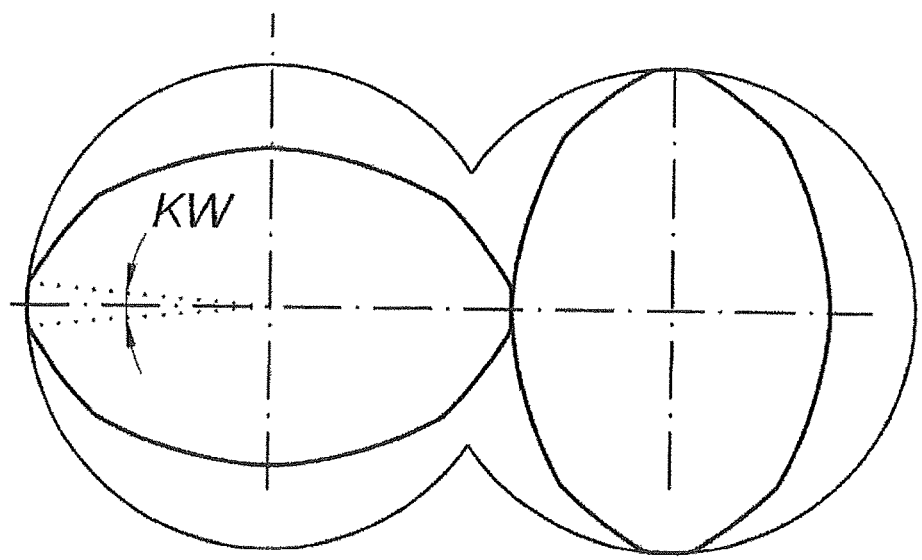
FIG. 5 shows a diagram of the cross section of screw elements used according to the invention.

FIG. 5 shows a diagram of the cross section of screw elements used according to the invention with a mirror- and point-symmetrical screw profile. In the present example, the centreline distance is 48 mm, the outer diameter of the screw profile is 58 mm, the internal diameter corresponds to 38 mm, and each of the tip angles is 0.175 (10°). By way of example, a tip angle KW has been included in the drawing. The total of all of the tip angles SKW is 0.69813, less than half of the total of the tip angles of the element of the prior art. The advantage here is lower energy dissipation.

Figure 9A:
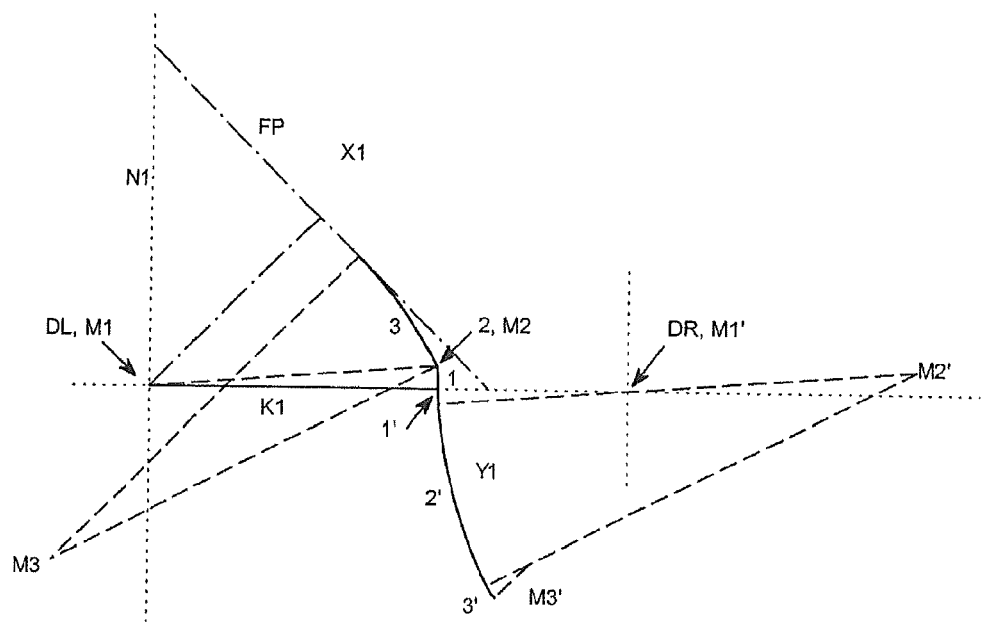
FIG. 9a shows two corresponding partial profiles of point- and mirror- symmetrical screw elements according to the invention.

FIG. 9a shows two corresponding partial profiles X1 (generating screw profile) and Y1 (generated screw profile) of an example of point- and mirror-symmetrical screw elements according to the invention. The partial profile X1 is formed by the circular arcs 1, 2 and 3. The partial profile Y1 is formed by the corresponding circular arcs 1', 2' and 3'. The separation of the points of rotation has been standardized to 1. The straight line FP is tangential to the circular arc 3. Table 1 states the radii, angles, starting points of the circular arcs, and centre points of the circular arcs.

TABLE 1

Figure 9B:
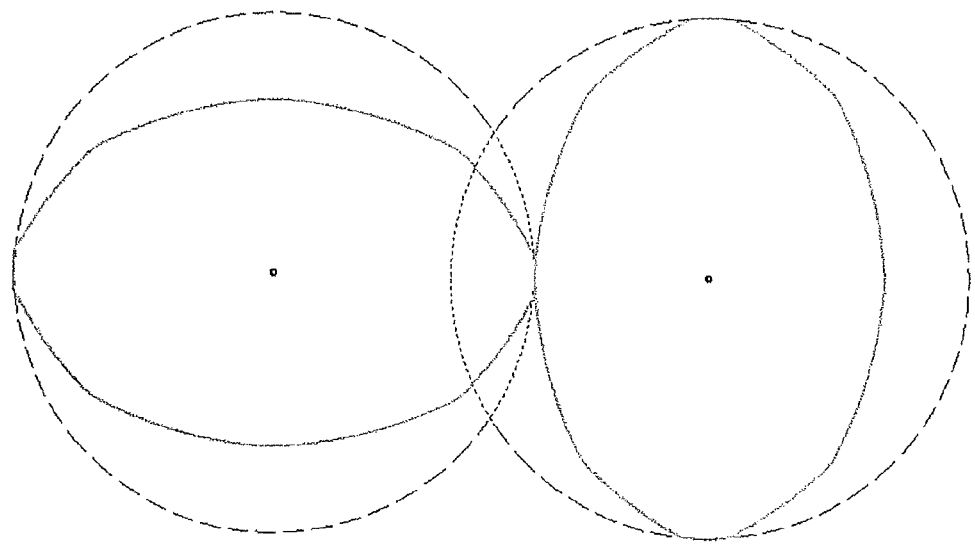
FIG. 9b shows the fully self-wiping profile obtained from FIG. 9a according to the invention.
Figure 9C:
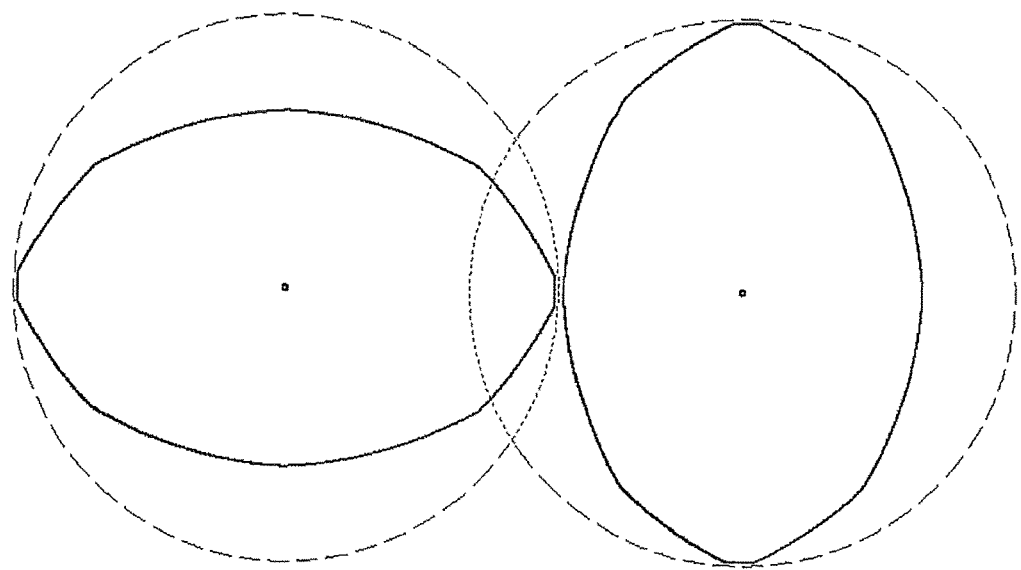
FIG. 9c shows a profile constructed by starting from the fully self-wiping profile in FIG. 9b and using the method of three-dimensional offsets.

Geometric variables for the partial profiles X and Y of screw elements according to the invention, shown in FIGS. 9a, 9b and 9c.

| Radius | Angle | x coordinate of starting point | y coordinate of starting point | x coordinate of centre point | y coordinate of centre point |
| --- | --- | --- | --- | --- | --- |
| 0.6 | 0.0799 | 0.6 | 0 | 0 | 0 |
| 0 | 0.3943 | 0.5981 | 0.0479 | 0.5981 | 0.0479 |
| 0.9 | 0.3112 | 0.5981 | 0.0479 | −0.2026 | −0.3631 |

FIG. 9b shows the fully self-wiping profile obtained from FIG. 9a via mirroring, extrapolation and rotation according to the invention. The tip angle KW of the fully self-wiping screw profile is 0.1598. The total of all of the tip angles SKW is 0.3196. For a fully self-wiping profile of the prior art, the tip angle KW0 is 0.399 and the total of all of the tip angles SKW0 is 0.799.

FIG. 9c shows a profile that was constructed by starting from the fully self-wiping profile in FIG. 9b and using the method of three-dimensional offsets. The barrel diameter is 0.61, and the clearances between barrel and screw δ and screw and screw s are in each case 0.02. The pitch is 1.2.

The actual tip angle of this profile is KWA=0.208. The total of all of the actual tip angles SKWA is 0.319.

Figure 9D:
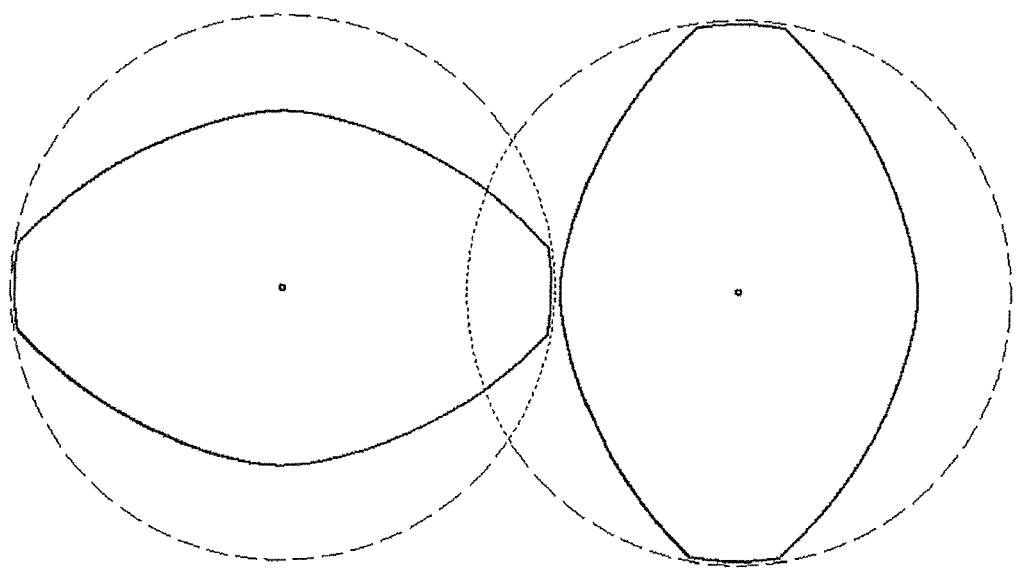
FIG. 9d shows a profile corresponding to the prior art, with identical clearances and identical pitch as in FIG. 9c.

FIG. 9d shows a profile corresponding to the prior art, with identical clearances and identical pitch as in FIG. 9c. The actual tip angle KWA0 of the profile is 0.329 and the total of the actual tip angles of the profile is 0.658.

Plastic compositions which may be extruded highly efficiently according to the invention while gentle treatment of the product is simultaneously ensured, are for example suspensions, pastes, glass, ceramic compositions, metals in the form of a melt, plastics, plastics melts, polymer solutions, elastomer and rubber compositions.

Plastics and polymer solutions are preferably used, particularly preferably thermoplastic polymers. Preferred thermoplastic polymers are preferably at least one of the series of polycarbonate, polyamide, polyester, in particular polybutylene terephthalate and polyethylene terephthalate, polylactides, polyether, thermoplastic polyurethane, polyacetal, fluoropolymer, in particular polyvinylidene fluoride, polyether sulfones, polyolefin, in particular polyethylene and polypropylene, polyimide, polyacrylate, in particular poly(methyl) methacrylate, polyphenylene oxide, polyphenylene sulfide, polyether ketone, polyarylether ketone, styrene polymers, in particular polystyrene, styrene copolymers, in particular styrene-acrylonitrile copolymer, acrylonitrile-butadiene-styrene block copolymers and polyvinyl chloride. Blends of the listed plastics are likewise preferably used, these being understood by a person skilled in the art to be a combination of two or more plastics. Particular preference is given to polycarbonate and mixtures containing polycarbonate, polycarbonate being very particularly preferred, it being obtained for example using the phase boundary method or the melt transesterification method.

Further preferred feed materials are rubbers. Preferred rubbers are preferably at least one from the series of styrene-butadiene rubber, natural rubber, butadiene rubber, isoprene rubber, ethylene-propylene-diene rubber, ethylene-propylene rubber, butadiene-acrylonitrile rubber, hydrogenated nitrile rubber, butyl rubber, halobutyl rubber, chloroprene rubber, ethylene-vinyl acetate rubber, polyurethane rubber, thermoplastic polyurethane, gutta percha, acrylate rubber, fluororubber, silicone rubber, sulfide rubber, chlorosulfonyl-polyethylene rubber. A combination of two or more of the listed rubbers, or a combination of one or more rubbers with one or more plastics is of course also possible.

These thermoplastics and elastomers may be used in pure form or as mixtures with fillers and reinforcing materials, such as in particular glass fibers, as mixtures with one another or with other polymers or as mixtures with conventional polymer additives.

In one preferred embodiment the plastics compositions, in particular the polymer melts and mixtures of polymer melts, have additives admixed with them. These may be placed as solids, liquids or solutions in the extruder together with the polymer or at least some of the additives or all the additives are supplied to the extruder via a side stream.

Additives may impart many different characteristics to a polymer. They may for example colorants, pigments, processing auxiliaries, fillers, antioxidants, reinforcing materials, UV absorbers and light stabilizers, metal deactivators, peroxide scavengers, basic stabilizers, nucleating agents, benzofurans and indolinones active as stabilizers or antioxidants, mold release agents, flame-retardant additives, antistatic agents, dye preparations and melt stabilizers. Examples of these are carbon black, glass fibers, clay, mica, graphite fibers, titanium dioxide, carbon fibers, carbon nanotubes, ionic liquids and natural fibers.

The advantages achieved when the method is used for various polymers vary depending on the type of extrusion process and the type of plastic composition.

When extruding polyethylene and polyethylene copolymers, an excessively high temperature results in an increase in molecular weight, branching and crosslinking. Polyethylene and polyethylene copolymers furthermore react with atmospheric oxygen in the autoxidation cycle known to a person skilled in the art ([2] Hepperle, J.: Schädigungsmechanismen bei Polymeren [Damage mechanisms in polymers], Polymeraufbereitung [Polymer compounding] 2002, VDI-K, VDI-Verlag GmbH, [3] Zweifel, H.: Stabilization of Polymeric Materials, Berlin, Springer 1997, [4] Schwarzenbach, K. et al.: Antioxidants, in Zweifel, H. (ed.): Plastics Additives Handbook, Munich, Hanser 2001, [5] Cheng, H. N., Schilling, F. C., Bovey, F. A.: $^{13}$C Nuclear Magnetic Resonance Observation of the Oxidation of Polyethylene, Macromolecules 9 (1976) p. 363-365) to form strong-smelling and thus disruptive low molecular weight components such as for example ketones, aldehydes, carboxylic acids and alcohols.

When extruding copolymers based on polyethylene and vinyl acetate, an excessively high temperature additionally results in the formation of strong-smelling and corrosive acetic acid.

When extruding polypropylene and polypropylene copolymers, a high temperature results in molecular weight degradation. Polypropylene and polypropylene copolymers furthermore react with atmospheric oxygen in the autoxidation cycle to form strong-smelling and thus disruptive low molecular weight components such as for example ketones, aldehydes, carboxylic acids and alcohols.

When extruding polyvinyl chloride, an excessively high temperature results in polyvinyl chloride discoloration and the elimination of corrosive gaseous hydrochloric acid, wherein the hydrochloric acid in turn catalyses further elimination of hydrochloric acid.

When extruding polystyrene, an excessively high temperature results in the formation of harmful styrene as well as dimeric and trimeric styrene, with molecular weight degradation and corresponding impairment of mechanical properties.

When extruding polystyrene-acrylonitrile copolymer (SAN), the product turns a yellowish color on exposure to thermal stress, resulting in reduced transparency, and forms the carcinogenic monomer acrylonitrile as well as styrene, with molecular weight degradation and impairment of mechanical properties.

When extruding aromatic polycarbonates, the product turns a yellowish color on exposure to excessive thermal stress, in particular due to the action of oxygen, resulting in reduced transparency, and exhibits molecular weight degradation, in particular due to the action of water. Monomers such as for example bisphenol A are also dissociated on exposure to elevated temperature.

When extruding polyesters such as for example polyethylene terephthalate, polybutylene terephthalate, polytrimethylene terephthalate or polylactides, an excessive temperature and the action of water result in a reduction in molecular weight and displacement of the end groups in the molecule. This is problematic especially when recycling polyethylene terephthalate. Polyethylene terephthalate eliminates acetaldehyde at elevated temperature, which may for example result in changes to the flavor of the contents of beverage bottles.

When extruding thermoplastics impact-modified with diene rubbers, in particular with butadiene rubber, in particular impact-modified grades of polystyrene (HIPS) and impact-modified SAN (acrylonitrile-butadiene-styrene, ABS), an excessive temperature results in the elimination of carcinogenic butadiene and toxic vinylcyclohexene. Furthermore the diene rubber crosslinks, resulting in impaired mechanical properties of the product.

When extruding polyoxymethylene, an excessive temperature results in the elimination of toxic formaldehyde.

When extruding polyamides such as polyamide 6, polyamide 6,6, polyamide 4,6, polyamide 11 and polyamide 12, an excessively high temperature results in product discoloration and molecular weight degradation and in the reformation of monomers and dimers, so resulting in impairment of mechanical properties, especially in the presence of water.

When extruding thermoplastic polyurethanes, an excessively high temperature results in changes to the molecular structure by transurethanization and, in the presence of water, in molecular weight degradation. Both of these undesirably influence the properties of the thermoplastic polyurethane.

When extruding polymethyl methacrylate, methyl methacrylate is eliminated and molecular weight degraded on exposure to excessive thermal stress, resulting in an odor nuisance and impaired mechanical properties.

When extruding polyphenylene sulfide, an excessively high temperature results in the elimination of sulfur-containing organic and inorganic compounds, which result in an odor nuisance and may lead to corrosion of the extrusion dies. Low molecular weight oligomers and monomers are also formed and the molecular weight degraded, so impairing the mechanical properties of polyphenylene sulfide.

When extruding polyphenylsulfone, an excessively high temperature results in the elimination of organic compounds, especially in the presence of water. The molecular weight also declines, resulting in impaired mechanical properties.

When extruding polyphenylene ether, excessively high temperatures result in the elimination of low molecular weight organic compounds, wherein the molecular weight declines. This results in impairment of the mechanical properties of the product.

When extruding diene rubbers such as for example polybutadiene (BR), natural rubber (NR) and synthetic polyisoprene (IR), butyl rubber (IIR), chlorobutyl rubber (CIIR), bromobutyl rubber (BIER), styrene-butadiene rubber (SBR), polychloroprene (CR), butadiene-acrylonitrile rubber (NBR), partially hydrogenated butadiene-acrylonitrile rubber (HNBR) and ethylene-propylene-diene copolymers (EPDM), an excessively high temperature results in gel formation by crosslinking, which leads to the impairment of mechanical properties of components produced therefrom. In the case of chloro- and bromobutyl rubber, an elevated temperature may result in the elimination of corrosive gaseous hydrochloric or hydrobromic acid, which in turn catalyzes further decomposition of the polymer.

When extruding rubber compounds which contain vulcanizing agents, such as for example sulfur or peroxides, excessively high temperatures result in premature vulcanization. This results in its no longer being possible to produce any products from these rubber compounds.

When extruding mixtures of one or more polymers at excessively high temperatures, the disadvantages of extruding the individual polymers occur in each case.

The sub-process of degassing polymers during production is carried out on "degassing extruders". Degassing extruders are known in principle to a person skilled in the art and described for example in [1]. "Degassing domes" are characteristic of degassing extruders. These are barrels with openings through which the vapors which arise can escape. As is known, different degassing domes may be operated at different pressures if product flow is restricted between the degassing domes, so creating a seal between the different pressures.

The screw elements according to the invention are preferably used in partially filled zones and particularly preferably in the degassing zones.

A degassing extruder according to the invention may be fed with product in various ways depending on the form assumed by the polymer. In a preferred variant, the extruder is fed with a liquid phase which, in addition to the polymer, may still contain solvent and optionally residual monomers. The form in which polymers are obtained after the reaction and optionally preliminary evaporation is known to a person skilled in the art. Examples are:

polystyrene with residual styrene and possibly ethylbenzene, toluene, xylene, butanone or another solvent styrene and acrylonitrile copolymer with residual styrene, residual acrylonitrile, and possibly ethylbenzene, toluene, xylene, butanone or another solvent linear low or high density polyethylene, branched polyethylene with solvents such as hexane, technical hexane, propane, isobutane and monomers such as propylene, butene-1, hexene-1,4-methylpentene-1, octene-1 (processes involving suspensions are: CX process, Mitsui Chemicals (hexane), Hostalen process Basell (hexane), Chevron Philips USA (isobutane), Borstar process, Borealis (propane) Belgium, and DSM uses hexane in a solvent process). Details in this connection are described in [6] (Comparative Analysis of Various Polyethylene Production Technologies, Chem. & Petroleum Eng. vol. 44, nos. 7-8, 2008)

polycarbonate with solvent, for example chlorobenzene and methylene chloride polymethyl methacrylate with monomer, i.e. methyl methacrylate In a preferred variant, the product is supplied to a liquid fed degassing extruder with "backward" degassing. In this case, an optionally preheated polymer solution is introduced into a twin-screw extruder, where it foams. The gases are then discharged backwards through the flights of the twin-screw extruder to a degassing dome. Such a backward degassing is in general prior art and described, for example, in [1] on pages 193-195. In this case, on input into the extruder the concentration of polycarbonate in the solution preferably amounts to between 55 mass % and 95 mass %, particularly preferably between 65 mass % and 90 mass %.

A further preferred variant for supplying product to a liquid fed degassing extruder involves flash evaporation at the extruder inlet. Flashing preferably proceeds directly above the extruder, such that the partially degassed melt falls directly onto the screws. The vapors arising from flashing are preferably drawn off from a separating vessel, which is likewise located above the extruder, by means of one or more vapor lines. The temperature of the polymer solution is preferably in the range from 180° C. to 300° C., particularly preferably between 200° C. and 250° C. Flashing is preferably operated in a pressure range between 0.3 bar abs and 6 bar abs, particularly preferably between 0.5 bar abs and 2 bar abs.

A further preferred variant for supplying product to a liquid-fed degassing extruder involves a shell-&-tube heat exchanger at the extruder inlet, which heat exchanger is arranged above the screws of the extruder, such that partially degassed polymer solution emerging from the tubes can fall directly onto the screws. A separating vessel, in which the vapors and polymer solution are separated from one another and which has at least one vapor outlet, is additionally located between the outlet of the shell-&-tube heat exchanger and the extruder screws. The polymer solution is introduced through an inlet opening at the upper end of the falling tube evaporator and supplied via a distributor plate to a plurality of tubes which are externally heated. Heating is preferably provided by condensing steam, a condensing organic heat-transfer medium or a liquid organic heat-transfer medium. The thermal energy for evaporating solvent is introduced into the polycarbonate melt via the internal surface of the tubes. Solvent fractions evaporate as a result, resulting in the formation of a biphasic gas-liquid mixture. Overheating of the polymer melt is thus purposefully avoided. The escaping solvent in vapor form brings about constant thorough mixing and surface renewal of the polymer melt, so ensuring more efficient concentration thereof. In this way, a distinctly more highly concentrated polycarbonate melt is supplied to the devolatilizing extruder, such that the same or even higher residual degassing of the polycarbonate melt may be achieved not only with a lower energy input but also a shorter residence time of the polycarbonate melt in the extruder. On input into the shell-&-tube heat exchanger, the concentration of the polymer solution is preferably between 50 and 80 wt. %. The tube heating temperature amounts to 240° C. to 360° C., preferably 250° C. to 340° C. and very particularly preferably 260° C. to 300° C. The polymer concentration on input into the extruder amounts to between 80 and 99 wt. %, preferably 90 to 99 wt. %. The pressure in the separating vessel preferably amounts to between 0.3 bar abs and 6 bar abs, particularly preferably between 0.5 bar abs and 2 bar abs.

A further preferred way of feeding a liquid-fed degassing extruder with product involves a foam evaporator, as is for example described for polycarbonate in EP 1 740 638. A foam evaporator may consist, for example, of a shell-&-tube assembly or a die plate. The polymer melt foams on emerging from the orifices of the foam evaporator and residual solvent is removed down to low residual contents.

This foam evaporator is preferably arranged above the screws of the extruder such that the polymer solution emerging from the tubes can fall directly onto the screws. A separating vessel, in which the vapors and polymer solution are separated from one another and which has at least one vapor outlet, is additionally located between the outlet of the shell-&-tube heat exchanger and the extruder screws.

A polycarbonate solution is particularly preferably used as the polymer solution.

In this case, the concentration of the polycarbonate solution on input into the foam evaporator amounts to between 90 wt. % and 99.95 wt. %. A foaming agent such as for example nitrogen, $CO_2$ is optionally added to the polycarbonate solution. The vapor pressure of the foaming agent together with the residual solvent amounts to 0.1 to 100 bar, preferably 0.5 to 60 bar and particularly preferably 1 to 40 bar. The pressure in the separator amounts to The polymer solution is divided into sub-streams of between 0.1 and 20 mbar through the orifices of the foam evaporator. The temperature of the polymer solution amounts to between 250° C. and 340° C. The pressure in the separating vessel preferably amounts to between 0.1 and 20 mbar.

FIG. 6 shows a degassing extruder according to the invention. In zone A, the polycarbonate solution is introduced into the extruder through a flash-evaporation tube 1. In the degassing vessel 2, the vapors are separated from the polycarbonate solution. Zones C, E, G, J and L are degassing zones. The vapors released therein are drawn off in the degassing domes 3. Zones B, D, F and H are restricted flow zones, in which a flow restricting element produces a plug of product which makes it possible to establish different pressures in respective neighboring zones. Entraining agent is additionally added in zone K to make degassing more effective in zone L. In zone M, the polymer is mixed with a side stream containing additives and pressure is built up for the filtration and die which follow the extruder.

FIG. 7 shows a further degassing extruder according to the invention. In zone A, the polycarbonate solution is introduced into the extruder through a vertical preheater 1. In the degassing vessel 2, the vapors are separated from the polycarbonate solution. Zones C, E, G, J and L are degassing zones. The vapors released therein are drawn off in the degassing domes 3. Zones B, D, F and H are restricted flow zones, in which a flow restricting element produces a plug of product which makes it possible to establish different pressures in respective neighboring zones. Entraining agent is additionally added in zone K to make degassing more effective in zone L. In zone M, the polymer is mixed with a side stream containing additives and pressure is built up for the filtration and die which follow the extruder.

Figure 8:
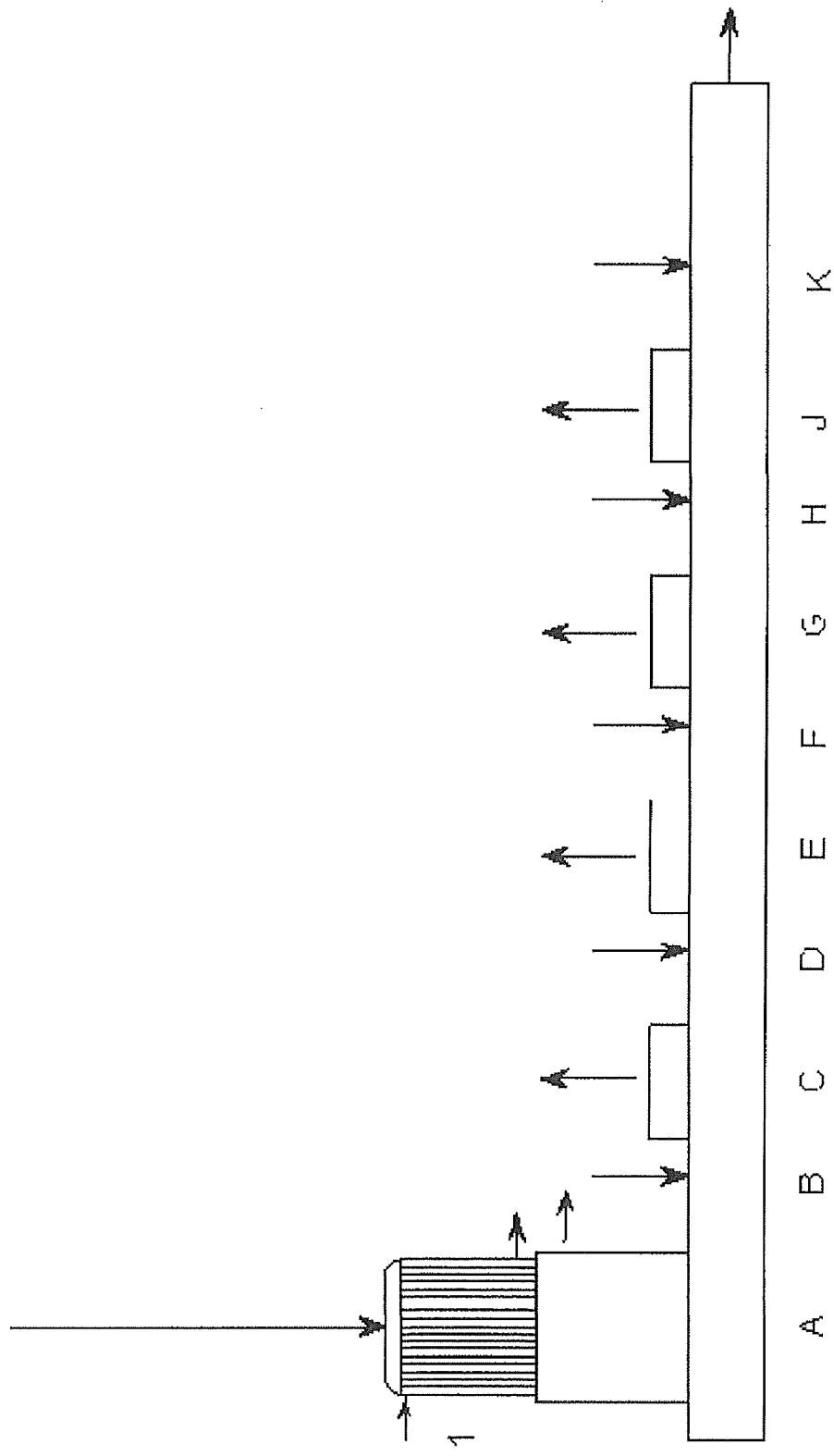
FIG. 8 shows a further degassing extruder according to the invention.

FIG. 8 shows a further degassing extruder according to the invention with a foam evaporator at the inlet. In zone A, the polycarbonate solution is introduced into the extruder through a foam evaporator 1. In the separator 2, the vapors are separated from the polycarbonate solution. In zones B, D, F and H, entraining agent is in each case introduced and dispersed. In zones C, E, F, G and J, the volatile constituents are separated from the polymer. In zone K, the polymer is mixed with a side stream containing additives and optionally further polymer and pressure is built up for the filtration and die which follow the extruder.

A twin- or multi-screw extruder according to the invention may also be fed with particles during polymer production. In this case, an extruder according to the invention above all serves for melting, for conversion and for mixing with additives. The form in which the polymers are obtained after the reaction and optionally preliminary evaporation or precipitation is known to a person skilled in the art. Examples are:

polypropylene, in which the polymer is obtained in the form of powder after the final reaction high density polyethylene from a gas phase or slurry process emulsion polymers such as for example acrylonitrile-butadiene-styrene after precipitation and optionally drying During compounding, a twin- or multi-screw extruder according to the invention is particularly suitable for tasks involving degassing. Particular advantages are here achieved during direct compounding of recycled polyethylene terephthalate from bottle material, which comprises degassing with minimal exposure to thermal stress.

The process according to the invention is particularly preferably used in the production and compounding of polycarbonate. It has advantages here above all with regard to the color of the polycarbonate, which, in uncolored polycarbonate, is measured with the yellowness index (YI). The screw elements according to the invention are here particularly preferably used in the degassing zone.

Diphenols suitable for the process according to the invention for producing polycarbonate have often been described in the prior art.

Suitable diphenols are for example hydroquinone, resorcinol, dihydroxydiphenyl, bis(hydroxyphenyl)alkanes, bis(hydroxyphenyl)cycloalkanes, bis(hydroxyphenyl) sulfides, bis(hydroxyphenyl)ethers, bis(hydroxyphenyl) ketones, bis(hydroxyphenyl) sulfones, bis(hydro-oxyphenyl) sulfoxides, α,α'-bis-(hydroxyphenyl)-diisopropylbenzenes, and the alkylated, ring-alkylated and ring-halogenated compounds thereof.

Preferred diphenols are 4,4'-dihydroxydiphenyl, 2,2-bis-(4-hydroxyphenyl)-1-phenylpropane, 1,1-bis-(4-hydroxyphenyl)-phenylethane, 2,2-bis-(4-hydroxyphenyl)propane, 2,4-bis-(4-hydroxy-phenyl)-2-methylbutane, 1,3-bis-[2-(4-hydroxyphenyl)-2-propyl]benzene (bisphenol M), 2,2-bis-(3-methyl-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl) sulfone, 2,4-bis-(3,5-dimethyl-4-hydroxyphenyl)-2-methylbutane, 1,3-bis-[2-(3,5-dimethyl-4-hydroxyphenyl)-2-propyl]-benzene and 1,1-bis-(4-hydroxyphenyl)-3,3,5-trimethylcyclohexane (bisphenol TMC).

Particularly preferred diphenols are 4,4'-dihydroxydiphenyl, 1,1-bis(4-hydroxyphenyl)-phenylethane, 2,2-bis(4-hydroxyphenyl)propane, 2,2-bis(3,5-dimethyl-4-hydroxyphenyl)propane, 1,1-bis(4-hydroxyphenyl)cyclohexane and 1,1-bis(4-hydroxyphenyl)-3,3,5-trimethylcyclohexane (bisphenol TMC).

In the case of homopolycarbonates, only one diphenol is used, while in the case of copolycarbonates two or more diphenols are used, wherein the diphenols used, like all the other chemicals and auxiliaries added to the synthesis, may obviously be contaminated with impurities originating from the synthesis, handling and storage thereof, although it is desirable to use the cleanest possible raw materials.

The monofunctional chain terminators required to control molecular weight, such as for example phenol or alkylphenols, in particular phenol, p-tert.-butylphenol, iso-octylphenol, cumylphenol, the chloroformic acid esters thereof or acid chlorides of monocarboxylic acids or mixtures of these chain terminators, are either introduced into the reaction with the bisphenolate or bisphenolates or alternatively added at any desired time during synthesis, providing that phosgene or chloroformic acid end groups are present in the reaction mixture or, in the case of acid chlorides and chloroformic acid esters as chain terminators, providing that sufficient phenolic end groups of the polymer being formed are available. Preferably, however, the chain terminator(s) are added after phosgenation at a location or time at which no phosgene is any longer present, but the catalyst has not yet been apportioned. Alternatively, they may also be apportioned before the catalyst, together with the catalyst or in parallel.

Branching agents or branching agent mixtures are optionally added to the synthesis in the same manner. Conventionally, however, branching agents are added before the chain terminators. As a rule trisphenols, quaterphenols or acid chlorides of tri- or tetracarboxylic acids or mixtures of the polyphenols or acid chlorides are used. Some of the compounds suitable as branching agents with three or more than three phenolic hydroxyl groups are for example phloroglucinol, 4,6-dimethyl-2,4,6-tri-(4-hydroxyphenyl)-heptene-2,4,6-dimethyl-2,4,6-tri-(4-hydroxyphenyl)-heptane, 1,3,5-tri(4-hydroxyphenyl)benzene, 1,1,1-tri(4-hydroxyphenyl)ethane, tri-(4-hydroxyphenyl)phenyl-methane, 2,2-bis (4,4-bis(4-hydroxyphenyl)cyclohexyl)propane, 2,4-bis-(4-hydroxyphenyliso-propyl)phenol, tetra-(4-hydroxyphenyl) methane.

Some other trifunctional compounds are 2,4-dihydroxybenzoic acid, trimesic acid, cyanuric chloride and 3,3-bis (3-methyl-4-hydroxyphenyl)-2-oxo-2,3-dihydroindole.

Preferred branching agents are 3,3-bis(3-methyl-4-hydroxyphenyl)-2-oxo-2,3-dihydroindole and 1,1,1-tri-(4-hydroxyphenyl)ethane.

The catalysts preferably used in the phase boundary synthesis of polycarbonate are tertiary amines, in particular triethylamine, tributylamine, trioctylamine, N-ethylpiperidine, N-methylpiperidine, N-i/n-propylpiperidine, quaternary ammonium salts such as tetrabutylammonium, tributylbenzylammonium, tetraethylammonium hydroxide, chloride, bromide, hydrogensulfate, tetrafluoroborate, and the phosphonium compounds corresponding to the ammonium compounds. These compounds are described in the literature as typical phase boundary catalysts, are commercially obtainable and are familiar to a person skilled in the art. The catalysts may be added to the synthesis individually, as a mixture or also in parallel and in succession, optionally also before phosgenation, but they are preferably apportioned after introduction of phosgene, unless an onium compound or a mixture of onium compounds are used as catalysts. In this case, addition preferably proceeds before the phosgene is apportioned. The catalyst or catalysts may be apportioned without solvent, in an inert solvent, preferably the polycarbonate synthesis solvent, or also as an aqueous solution, in the case of tert.-amines then as the ammonium salts thereof with acids, preferably mineral acids, in particular hydrochloric acid. When a plurality of catalysts are used or the total amount of catalyst is apportioned in proportions, different methods of apportionment may of course be used at different points or at different times. The total quantity of catalysts used amounts to 0.001 to 10 mol % relative to introduced moles of bisphenols, preferably 0.01 to 8 mol %, particularly preferably 0.05 to 5 mol %.

Polycarbonate synthesis may be carried out continuously or discontinuously. The reaction may therefore proceed in stirred-tank reactors, tubular reactors, pumped circulation reactors or cascades of stirred-tank reactors or combinations thereof. It must here be ensured by using the abovementioned mixing elements that aqueous and organic phases as far as possible do not segregate until the synthesis mixture has reacted to completion, i.e. it no longer contains any saponifiable chlorine of phosgene or chloroformic acid esters.

After introduction of the phosgene, it may be advantageous to mix the organic phase and the aqueous phase thoroughly for a certain time, before optionally adding branching agent, if the latter has not been apportioned together with the bisphenolate, chain terminator and catalyst. Such a post-reaction time may be advantageous after each apportionment. These post-stirring times amount to 10 seconds to 60 minutes, preferably 30 seconds to 40 minutes, particularly preferably 1 to 15 minutes.

The organic phase may consist of one solvent or mixtures of a plurality of solvents. Suitable solvents are chlorinated hydrocarbons (aliphatic and/or aromatic), preferably dichloromethane, trichloroethylene, 1,1,1-trichloroethane, 1,1,2-trichloroethane and chlorobenzene and mixtures thereof.

Aromatic hydrocarbons such as benzene, toluene, m/p/o-xylene or aromatic ethers such as anisole may, however, also be used alone, as a mixture with or in addition to chlorinated hydrocarbons. Another embodiment of the synthesis uses solvents which do not dissolve polycarbonate, but instead only cause it to swell. It is therefore also possible to use nonsolvents for polycarbonate in combination with solvents. Solvents such as tetrahydrofuran, 1,3/1,4-dioxane or 1,3-dioxolane soluble in the aqueous phase may here also be used as the solvents, if the solvent partner forms the second organic phase.

The at least biphasic reaction mixture, which has reacted to completion and still contains at most traces (<2 ppm) of chloroformic acid esters, is left to stand for phase separation. The aqueous alkaline phase may possibly be entirely or partially returned to the polycarbonate synthesis as the aqueous phase or alternatively sent for wastewater treatment in which the solvent and catalyst fractions are separated and recirculated. In another variant of working up, once the organic impurities, in particular solvents and polymer residues, have been separated out and optionally after a specific pH value has been established, for example by addition of sodium hydroxide, the salt is separated, which can for example be sent to chlor-alkali electrolysis, while the aqueous phase is optionally returned to the synthesis.

The organic phase containing the polycarbonate may now be purified of any contaminants of an alkaline, ionic or catalytic nature. Even after one or more settling operations, the organic phase still contains proportions of the aqueous alkaline phase in fine droplets and the catalyst, as a rule a tert.-amine. The settling operations may optionally be assisted by the organic phase passing through settling tanks, stirred-tank reactors, coalescers or separators or combinations thereof, wherein water may optionally be apportioned in each or individual separation steps, under certain circumstances using active or passive mixing elements.

After this coarse separation of the alkaline, aqueous phase, the organic phase is washed once or more with dilute acids, mineral acids, carboxylic, hydroxycarboxylic and/or sulfonic acids. Aqueous mineral acids are preferred, in particular hydrochloric acid, phosphorous acid and phosphoric acid or mixtures of these acids. The concentration of these acids should be in the range from 0.001 to 50 wt. %, preferably from 0.01 to 5 wt. %.

The organic phase is furthermore repeatedly washed with deionized or distilled water. Separation of the organic phase, optionally dispersed with proportions of the aqueous phase, after the individual washing steps proceeds by means of settling tanks, stirred-tank reactors, coalescers or separators or combinations thereof, wherein the washing water may be apportioned between the washing steps optionally using active or passive mixing elements.

Between these washing steps or also after washing, acids may optionally be added, preferably dissolved in solvent on which the polymer solution is based. Gaseous hydrogen chloride and phosphoric acid or phosphorous acid, which may optionally also be used as mixtures, are preferably used here.

This purified solution is then supplied in the next step to the devolatilizing extruder having particular screw geometries.

Properties of the polycarbonates obtained by the process according to the invention may be modified with conventional additives and additional substances (e.g. auxiliaries and reinforcing materials). The purpose of adding additives and added substances is to extend service life (for example hydrolysis or degradation stabilizers), to improve color stability (for example heat and UV stabilizers), to simplify processing (for example mold release agents, flow auxiliaries), to improve service characteristics (for example antistatic agents), to improve flame retardancy, to influence visual appearance (for example organic colorants, pigments) or to adapt polymer properties to specific stresses (impact modifiers, finely divided minerals, fibrous materials, silica flour, glass fibers and carbon fibers).

The invention is further explained below by using FIG. 1, which represents an example of the invention.

The polymer solution is supplied via a supply line 1 to the tube-bundle heat exchanger 2, which is open at the bottom. The tube-bundle heat exchanger is heated by heating fluid, which is supplied at 3 and discharged at 4. At the end of the tubes, the polymer solution is depressurized into the separating vessel 5, which is arranged directly above the extruder. The gas liberated is discharged by way of the vapor line 6. The product descends directly into the feed zone 7 of the extruder, and is supplied via a sealing zone 8 to the first degassing zone 9, which has a degassing dome 10. There are then further restricted-flow zones 8 and degassing zones 9. Prior to the last degassing dome, nitrogen is added by way of the addition point 12 in the kneading zone 11. Additives and, if appropriate, molten polymer are then added at addition point 13, and are mixed with the polymer stream in the zone 14 which serves for pressure build-up and mixing.

The following examples serve to illustrate the invention by way of example and should not be regarded as restricting.

The relative viscosity of polycarbonate is determined as the ratio between the viscosity of a polymer solution and the viscosity of the pure solvent. It is generally determined in dichloromethane using a concentration of 5 g of polymer for one liter of solvent, at 25° C.

COMPARATIVE EXAMPLE 1

6750 g/h of a solution with 65% of polycarbonate are fed into a degassing extruder of FIG. 6. The temperature of the solution prior to flashing is 230° C. All of the zones have screw elements of the prior art. Zones A to L have double-flighted elements, and zone M has triple-flight elements. The relative solution viscosity of the polycarbonate is 1.295. The rotation rate of the extruder is 350/min. The pressure at the inlet (zone A) is 1.4 bar abs. and the pressure in zones C, E, G, J and L is lowered stepwise from 1 bar abs to 5 mbar abs. In zone K, 15 kilograms per hour of nitrogen as entrainer are added and dispersed.

The temperature downstream of the devolatilizing extruder is 398.4° C. and the residual content of chlorobenzene is smaller than 400 ppm. Yellowness Index is 1.9.

INVENTIVE EXAMPLE 2

6750 g/h of a solution with 65% of polycarbonate are fed into a degassing extruder of FIG. 6. The temperature of the solution prior to flashing is 230° C. Zones A, B, C, D, E, F, G and M have screw elements of the prior art. Zones J, K and L are equipped with inventive screw elements. The relative solution viscosity of the polycarbonate is 1.295. The rotation rate of the extruder is 350/min. The pressure at the inlet (zone A) is 1.4 bar abs. and the pressure in zones C, E, G, J and L is lowered stepwise from 1 bar abs to 5 mbar abs. In zone K, 15 kilograms per hour of nitrogen as entrainer are added and dispersed.

The temperature downstream of the devolatilizing extruder is 386.7° C. and the residual content of chlorobenzene is smaller than 400 ppm. Yellowness Index is 1.5.

COMPARATIVE EXAMPLE 3

7500 g/h of a solution with 65% of polycarbonate are fed into a degassing extruder of FIG. 7. The solution is preheated by a tube-bundle heat exchanger 1 prior to inlet into the extruder. All of the zones have screw elements of the prior art. Zones A to L have double-flighted elements, and zone M has triple-flight elements. The relative solution viscosity of the polycarbonate is 1.295. The rotation rate of the extruder is 350/min. The pressure at the inlet (zone A) is 1.4 bar abs. and the pressure in zones C, E, G, J and L is lowered stepwise from 1 bar abs to 5 mbar abs. In zone K, 15 kilograms per hour of nitrogen as entrainer are added and dispersed.

The temperature downstream of the devolatilizing extruder is 399.2° C., the residual content of chlorobenzene is smaller than 400 ppm, and Yellowness Index is 2.2.

INVENTIVE EXAMPLE 4

7500 g/h of a solution with 65% of polycarbonate are fed into a degassing extruder of FIG. 6. The temperature of the solution prior to flashing is 230° C. Zones A, B, C, D, E, F, G and M have screw elements of the prior art. Zones J, K and L are equipped with inventive screw elements. The relative solution viscosity of the polycarbonate is 1.295. The rotation rate of the extruder is 350/min. The pressure at the inlet (zone A) is 1.4 bar abs. and the pressure in zones C, E, G, J and L is lowered stepwise from 1 bar abs to 5 mbar abs. In zone K, 15 kilograms per hour of nitrogen as entrainer are added and dispersed.

The temperature downstream of the devolatilizing extruder is 388° C., the residual content of chlorobenzene is smaller than 400 ppm, and Yellowness Index is 1.7.

The invention claimed is:

1. A process for extruding plastic compositions comprising extruding the plastic compositions in a multi-screw extruder, co-rotating the screw elements of the extruder in pairs and the screw elements being fully self-wiping in pairs, using screw elements with two or more screw flights Z, with centreline distance A and outer diameter DE, wherein a total of the tip angles of a pair of centreline distance A and an outer diameter DE, wherein a total of the tip angles of a pair of screw elements is greater than zero and smaller than $$2\pi - 4Z \arccos\left(\frac{A}{DE}\right).$$

using screw elements wherein each screw element comprising circular arcs which wipe the outer wall, and wherein the number of flights Z corresponds to the number of circular arcs wiping the outer wall, and wherein each screw element has one of a generating screw profile or a generated screw profile, and each generating and generated screw profile is composed of 6*Z or more circular arcs with a radius greater than or equal to zero and smaller than or equal to A, wherein the circular arcs merge tangentially into one another at their end points, wherein the circular arcs have different radii and/or centers.

2. The process as claimed in claim 1, each pair of the screw elements having corresponding circular arcs of the generated and generating screw profile, wherein:
   the angles of corresponding circular arcs are of identical magnitude,
   the total of the radii of corresponding circular arcs is equal to the centreline distance,
   respectively one of the connecting lines between the centre point of the circular arc of the generating screw profile and end points thereof runs parallel to respectively one of the connecting lines between the centre point of the corresponding circular arc of the generated screw profile and end points thereof,
   the directions in which the end points of the circular arc of the generating screw profile lie, starting from the centre point of the circular arc, are in each case opposite to the directions in which the end points of the corresponding circular arc of the generated screw profile lie, starting from the centre point of the circular arc of the generated screw profile,
   the distance between the centre point of the circular arc of the generating screw profile and the centre point of the corresponding circular arc of the generated screw profile corresponds to the centreline distance,
   the connecting line between the centre point of the circular arc of the generating screw profile and the centre point of the corresponding circular arc of the generated screw profile is parallel to the connecting line between the point of rotation of the generating screw profile and the point of rotation of the generated screw profile,
   the direction in which the centre point of the circular arc of the generating screw profile would have to shift in order to be the same as the centre point of the corresponding circular arc of the generated screw profile is the same as that in which the point of rotation of the generating screw profile would have to shift in order to be the same as the point of rotation of the generated screw profile.

3. The process as claimed in claim 1, wherein for at least one tip arc of a profile of the screw elements there is a following circular arc with radius 0.

4. The process as claimed in claim 1, wherein for at least one tip arc of a profile of the screw elements, there is a following circular arc with radius >0 and less than 0.1 times the screw diameter.

5. The process as claimed in claim 1, wherein tip arcs and groove arcs of the screw elements alternate on the periphery of a profile.

6. The process as claimed in claim 1, wherein the screw elements have a number of symmetry axes which corresponds to those of the number of flights.

7. The process as claimed in claim 1, wherein the screw elements have point symmetry but do not have mirror symmetry.

8. The process as claimed in claim 1, wherein the screw elements are constructed as conveying elements.

9. The process as claimed in claim 1, wherein the screw elements are used in a degassing or conveying zone.

10. The process as claimed in claim 1, wherein clearances in the range from 0.1 to 0.001 relative to the diameter of the screw profile have between screw elements and barrel and/or between neighboring screw elements.

11. The process as claimed in claim 1, wherein the plastic compositions are thermoplastics or elastomers.

12. The process as claimed in claim 11, wherein the thermoplastics used are polycarbonate, polyamide, polyester, in particular polybutylene terephthalate and polyethylene terephthalate, polyether, thermoplastic polyurethane, polyacetal, fluoropolymer, in particular polyvinylidene fluoride, polyether sulfones, polyolefin, in particular polyethylene and polypropylene, polyimide, polyacrylate, in particular poly(methyl)methacrylate, polyphenylene oxide, polyphenylene sulfide, polyether ketone, polyarylether ketone, styrene polymers, in particular polystyrene, styrene copolymers, in particular styrene-acrylonitrile copolymer, acrylonitrile-butadiene-styrene block copolymers, polyvinyl chloride or a blend of at least two of the stated thermoplastics.

13. The process as claimed in claim 12, wherein polycarbonate or a blend of polycarbonate with other polymers is used as the thermoplastic.

14. The process as claimed in claim 13, wherein the polycarbonate was produced by the phase boundary process or the melt transesterification process.

15. The process as claimed in claim 11, wherein the elastomer used is styrene-butadiene rubber, natural rubber, butadiene rubber, isoprene rubber, ethylene-propylene-diene rubber, ethylene-propylene rubber, butadiene-acrylonitrile rubber, hydrogenated nitrile rubber, butyl rubber, halobutyl rubber, chloroprene rubber, ethylene-vinyl acetate rubber, polyurethane rubber, thermoplastic polyurethane, gutta percha, acrylate rubber, fluororubber, silicone rubber, sulfide rubber, chlorosulfonyl-polyethylene rubber or a combination of at least two of the stated elastomers.

16. The process as claimed in claim 1, wherein fillers or reinforcing materials or polymer additives or organic or inorganic pigments, or mixtures thereof, are added to the polymer.

* * * * *